(12) United States Patent
Ikai et al.

(10) Patent No.: US 11,994,835 B2
(45) Date of Patent: May 28, 2024

(54) APPARATUS, CONTROLLER, AND METHOD FOR GENERATING IMAGE DATA OF MOVEMENT PATH OF INDUSTRIAL MACHINE

(71) Applicant: Fanuc Corporation, Yamanashi (JP)

(72) Inventors: Satoshi Ikai, Yamanashi (JP); Tomoyuki Aizawa, Yamanashi (JP)

(73) Assignee: Fanuc Corporation, Tokyo (JP)

( * ) Notice: Subject to any disclaimer, the term of this patent is extended or adjusted under 35 U.S.C. 154(b) by 785 days.

(21) Appl. No.: 17/073,577

(22) Filed: Oct. 19, 2020

(65) Prior Publication Data

US 2021/0132576 A1    May 6, 2021

(30) Foreign Application Priority Data

Oct. 31, 2019    (JP) .................... 2019-198977

(51) Int. Cl.
*G05B 19/406* (2006.01)
*B25J 9/16* (2006.01)
*G06T 11/60* (2006.01)

(52) U.S. Cl.
CPC .......... *G05B 19/406* (2013.01); *B25J 9/1653* (2013.01); *B25J 9/1674* (2013.01); *G06T 11/60* (2013.01); *G05B 2219/33099* (2013.01)

(58) Field of Classification Search
CPC ........ G05B 19/406; G05B 2219/33099; G05B 2219/32342; G05B 2219/36043; G05B 2219/36047; G05B 2219/36053; G05B 2219/40311; B25J 9/1653; B25J 9/1674; B25J 9/1656; G06T 11/60; G06T 11/206;
(Continued)

(56) References Cited

U.S. PATENT DOCUMENTS 9,423,785 B2    8/2016   Tezuka et al.
2004/0132297 A1*  7/2004   Baba ............... G01N 21/88
                                                438/689
(Continued)

FOREIGN PATENT DOCUMENTS

DE    102010017763 B4 *  1/2015  .......... G05B 19/409
JP       05289729 A     11/1993
(Continued)

*Primary Examiner* — Thomas C Lee
*Assistant Examiner* — Tyler Dean Hedrick
(74) *Attorney, Agent, or Firm* — Buchanan Ingersoll & Rooney PC

(57) ABSTRACT

An apparatus configured to facilitate identifying a factor for a defect if the defect occurs in a finished surface of the workpiece. An apparatus includes a movement path generation section configured to generate the movement path of the industrial machine when performing a work on a workpiece; a running information acquisition section configured to acquire running information of the industrial machine when performing a work on the workpiece; and an image data generation section configured to generate the image data in which a first point on the movement path corresponding to a change point of first running information, and a second point on the movement path corresponding to a change point of second running information different from the first running information are highlighted on the movement path in display forms visually different from each other.

10 Claims, 13 Drawing Sheets

(58) Field of Classification Search
CPC ... G06T 7/20; G06T 2207/10016; Y02P 90/02
See application file for complete search history.

(56) References Cited

U.S. PATENT DOCUMENTS

| | | | |
|---|---|---|---|
| 2005/0220335 A1* | 10/2005 | Budd | G01N 21/8851 |
| | | | 382/152 |
| 2007/0052795 A1* | 3/2007 | Swanger | G06T 7/155 |
| | | | 348/92 |
| 2018/0196405 A1* | 7/2018 | Maekawa | G05B 19/404 |
| 2021/0232128 A1* | 7/2021 | Kiefer | B26D 5/007 |

FOREIGN PATENT DOCUMENTS

| | | | |
|---|---|---|---|
| JP | 2004021954 A | 1/2004 | |
| JP | 2011165066 A | 8/2011 | |
| JP | 2014078102 A | 5/2014 | |
| JP | 5731463 B | 6/2015 | |

\* cited by examiner

APPARATUS, CONTROLLER, AND METHOD FOR GENERATING IMAGE DATA OF MOVEMENT PATH OF INDUSTRIAL MACHINE

CROSS-REFERENCE TO RELATED APPLICATIONS

This application is a new U.S. Patent Application that claims benefit of Japanese Patent Application No. 2019-198977, filed on Oct. 31, 2019, the disclosure of which is incorporated herein by reference in its entirety for all purposes.

BACKGROUND OF THE INVENTION

1. Field of the Invention

The present invention relates to an apparatus, a controller, and a method for generating image data of a moving path of an industrial machine.

2. Description of the Related Art

Apparatuses configured to generate movement paths of industrial machines that perform works on workpieces are known (e.g., JP 5731463 B). When a work is performed on a workpiece by an industrial machine, defects may occur in a finished surface of the workpiece. There has been a need for techniques that facilitate identifying factors for such defects.

SUMMARY OF THE INVENTION

In an aspect of the present disclosure, an apparatus configured to generate image data of a movement path of an industrial machine includes a movement path generation section configured to generate the movement path of the industrial machine when performing a work on a workpiece; a running information acquisition section configured to acquire running information of the industrial machine when performing the work on the workpiece; and an image data generation section configured to generate the image data in which a first point on the movement path corresponding to a change point of first running information, and a second point on the movement path corresponding to a change point of second running information different from the first running information are highlighted on the movement path in display forms visually different from each other.

In another aspect of the present disclosure, a method for generating image data of a movement path of an industrial machine includes: generating the movement path of the industrial machine when performing a work on a workpiece; acquiring running information of the industrial machine when performing the work on the workpiece; and generating the image data in which a first point on the movement path corresponding to a change point of first running information, and a second point on the movement path corresponding to a change point of second running information different from the first running information are highlighted on the movement path in display forms visually different from each other.

According to the present disclosure, if a defect occurs in a finished surface of the workpiece when an industrial machine performs a work on a workpiece, an operator can easily identify a factor for the defect.

DETAILED DESCRIPTION

Figure 1:
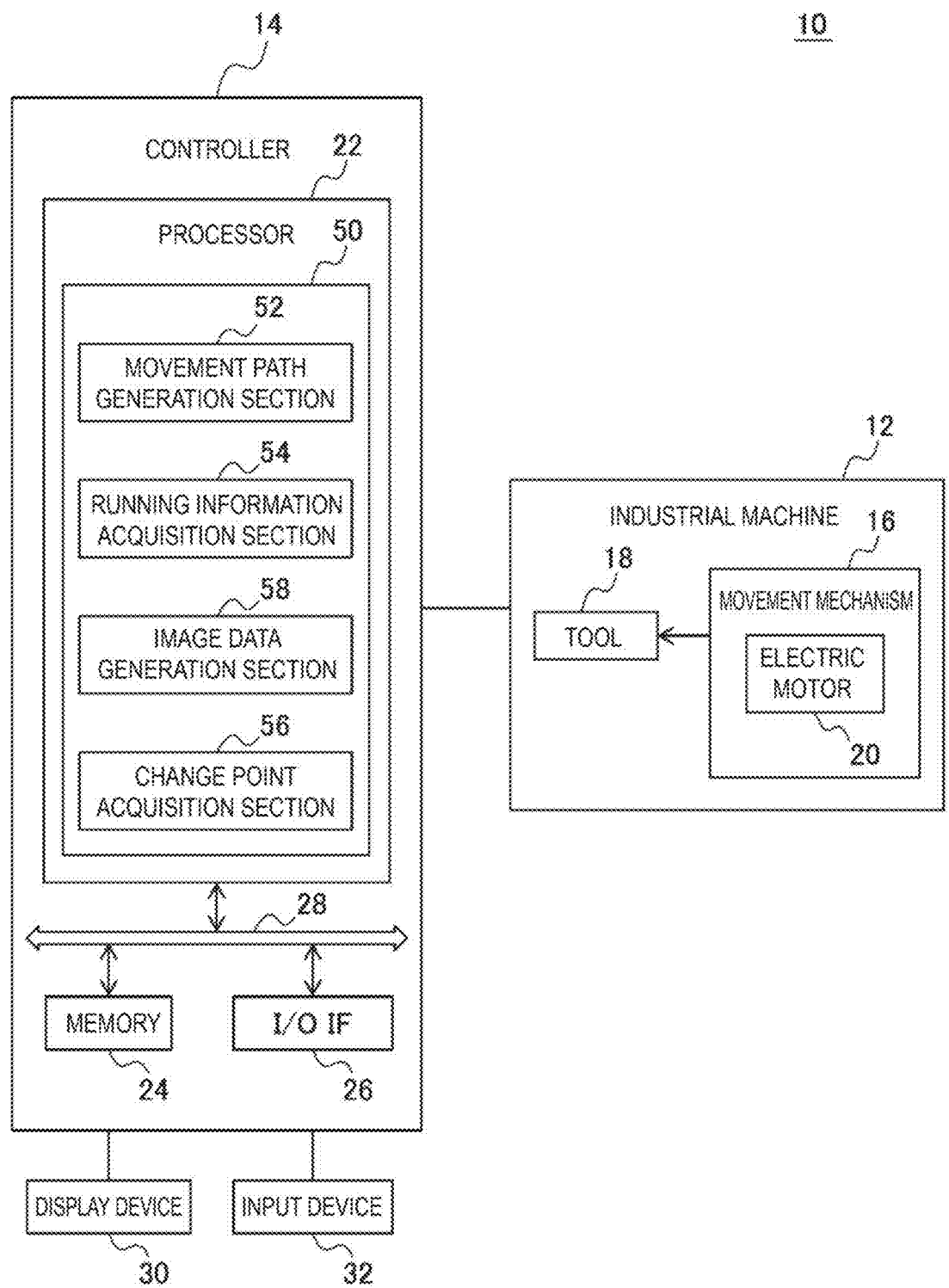
FIG. 1 is a block diagram of a mechanical system according to an embodiment.

Hereinafter, embodiments of the present disclosure will be described in detail with reference to the drawings. In the various embodiments described below, similar elements are denoted by the same reference numeral, and redundant description thereof will be omitted. Referring first to FIG. 1, a mechanical system 10 according to an embodiment will be described. The mechanical system 10 includes an industrial machine 12 and a controller 14.

The industrial machine 12 is e.g. a machine tool (a lathe, milling machine, machining center, etc.), or an industrial robot (a vertical articulated robot, horizontal articulated robot, parallel link robot, etc.), and performs a predetermined work on a workpiece. The industrial machine 12 includes a movement mechanism 16 and a tool 18. The movement mechanism 16 includes at least one electric motor 20, and relatively moves the tool 18 with respect to a workpiece to be worked.

The electric motor 20 is e.g. a servomotor, and the controller 14 sends a command to the electric motor 20 so as to operate the movement mechanism 16 by driving the electric motor 20, thereby moving the tool 18 relative to the workpiece. The tool 18 is e.g. a cutting tool, a laser processing head, a welding torch, or a coating material applicator, and performs a predetermined work (e.g., cutting, laser processing, welding, or coating) on the workpiece.

As an example, when the industrial machine 12 is the machine tool, the movement mechanism 16 moves a processing table, on which the workpiece is set, in a horizontal direction, and moves a spindle head, on which the tool 18 (cutting tool) is set, in a vertical direction. As another example, when the industrial machine 12 is the industrial robot (articulated robot), the movement mechanism 16 includes a rotary barrel provided at a robot base so as to be rotatable about a vertical axis, a robot arm rotatably provided at the rotary barrel, and a wrist provided at a tip of the robot arm, and moves the tool 18 attached to the wrist to any position in a three-dimensional space.

The controller 14 controls the operation of the industrial machine 12. Specifically, the controller 14 is a computer including a processor 22, a memory 24, and an I/O interface 26. The processor 22 includes e.g. a CPU, or GPU, and executes arithmetic processing to perform various functions described later. The processor 22 is communicably connected to the memory 24 and the I/O interface 26 via a bus 28.

The memory 24 includes e.g. a ROM or RAM, and stores various types of data temporarily or permanently. The I/O interface 26 communicates with an external device, receives data from the external device, and transmits data to the external device, under the control of the processor 22. In the present embodiment, a display device 30 and an input device 32 are communicably connected to the I/O interface 26 in wireless or wired manner.

The display device 30 includes e.g. an LCD, an organic EL display, and the processor 22 transmits image data to the display device 30 via the I/O interface 26 to display the image on the display device 30. The input device 32 includes e.g. a keyboard, mouse, or touch sensor, and transmits information inputted by the operator to the processor 22 via the I/O interface 26. The display device 30 and the input device 32 may be provided integrally with the controller 14, or may be provided separate from the controller 14.

In the present embodiment, the processor 22 functions as an apparatus 50 configured to generate the image data of a movement path of the industrial machine 12. The function of the apparatus 50 will be described below. The processor 22 generates a movement path MP of the industrial machine 12 when performing a work on a workpiece. For example, the processor 22 generates the movement path MP of the tool 18 (specifically, a tool tip point, TCP, or the like), which is moved by the movement mechanism 16, with respect to the workpiece.

In the present embodiment, the processor 22 generates a movement path $MP_1$ (first movement path) defined by a work program WP for performing the work on the workpiece. The work program WP is a computer program (e.g., a G code program) including a plurality of statements that define a plurality of target positions at which the tool 18 is to be arranged with respect to the workpiece, a minute line segment connecting two adjacent target positions, a target velocity of the tool 18 with respect to the workpiece, etc.

The processor 22 analyzes the work program WP and generates a command to be transmitted to the electric motor 20 in order to perform the work on the workpiece. In this way, the processor 22 operates the movement mechanism 16 in accordance with the work program WP so as to perform the work on the workpiece by the tool 18. The work program WP is stored in the memory 24.

Figure 2:
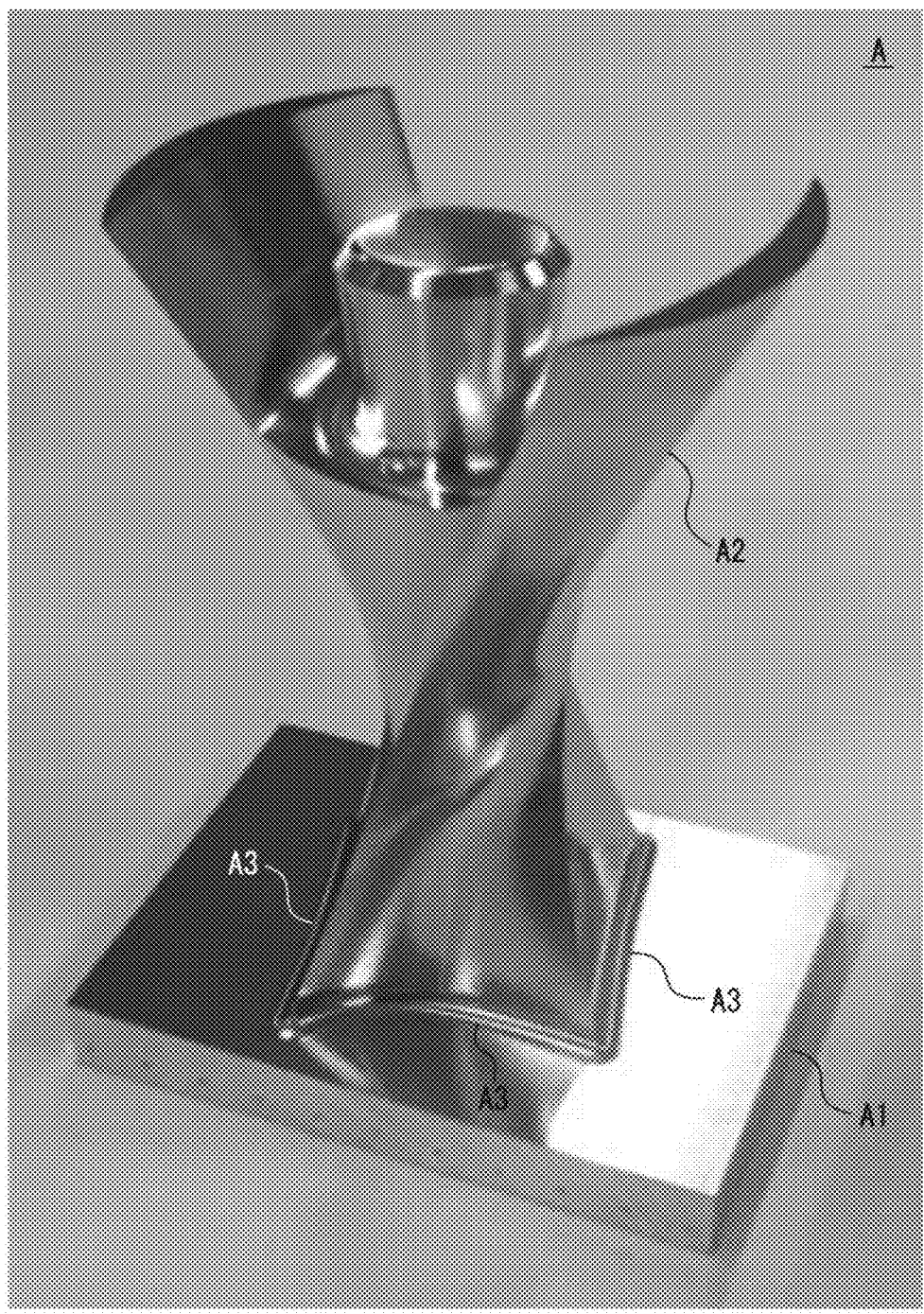
FIG. 2 is a perspective view of a workpiece according to an embodiment.

The processor 22 generates the movement path $MP_1$ in the three-dimensional space by analyzing the work program WP. The movement path $MP_1$ is an aggregate of the minute line segments defined in the work program WP. The movement path $MP_1$ is a movement path in control of the movement mechanism 16 (tool 18). For example, assume that the industrial machine 12 forms a workpiece A in FIG. 2 by the tool 18.

Figure 3:
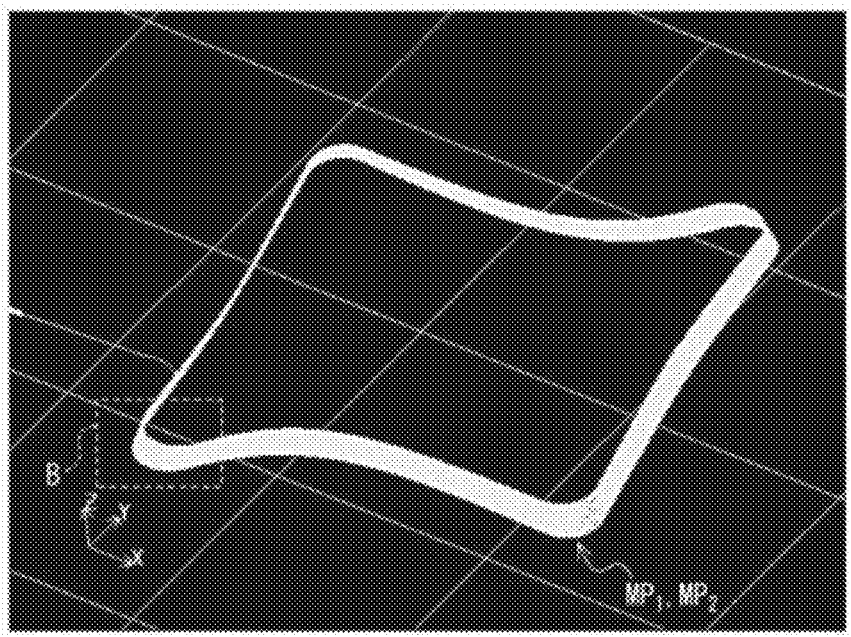
FIG. 3 is an image of a movement path of an industrial machine when performing a work on a workpiece illustrated in FIG. 3.
Figure 4:
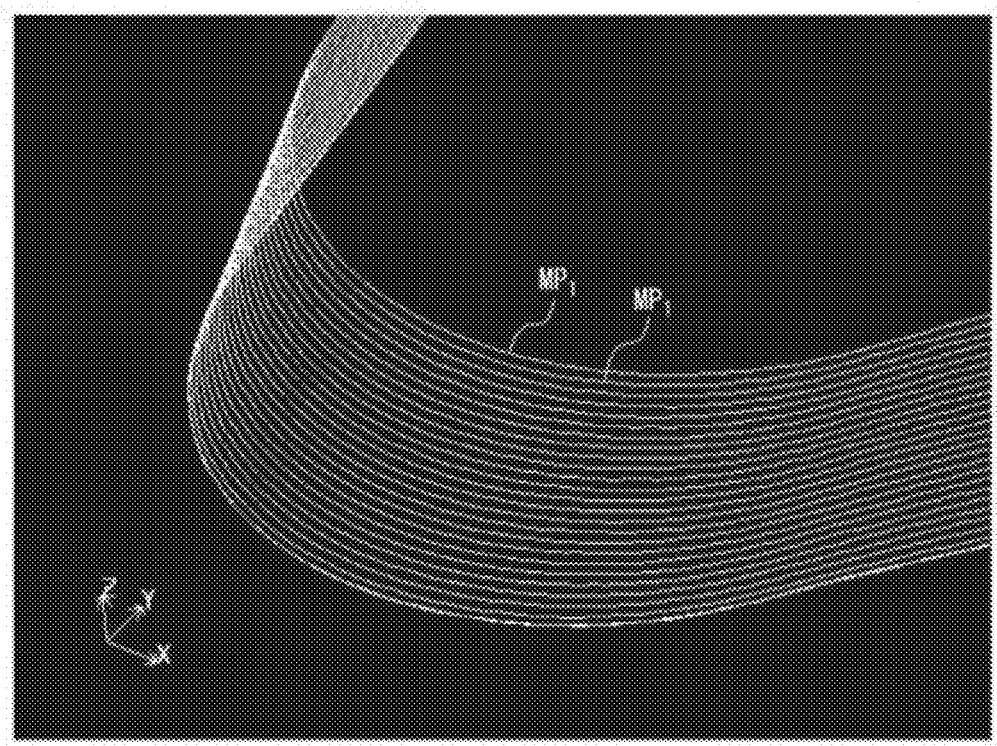
FIG. 4 is an enlarged view of a region B in FIG. 3.

In this case, an example of the movement path $MP_1$ of the tool 18 with respect to the workpiece A when forming a connection portion A3 between a base portion A1 and a main body portion A2 of the workpiece A is illustrated in FIGS. 3 and 4. Note that FIG. 4 is an enlarged view of region B in FIG. 3. Each of lines illustrated in FIG. 4 constitutes the movement path $MP_1$, and an outer surface of the connection portion A3 is defined by the movement path $MP_1$.

The processor 22 generates such movement path $MP_1$ from the work program WP. In FIGS. 3 and 4, the movement path $MP_1$ when forming the connection portion A3 of the workpiece A is exemplified. However, it will be appreciated that the processor 22 can similarly generate the movement path $MP_1$ for forming the base portion A1 and the main body portion A2 of the workpiece A from the work program WP. Thus, in the present embodiment, the processor 22 functions as a movement path generation section 52 (FIG. 1) configured to generate the movement path $MP_1$.

The processor 22 acquires running information of the industrial machine 12 when performing the work on the workpiece A. In the present embodiment, the processor 22 acquires the running information from the work program WP. The running information acquired from the work program WP includes e.g. information of a position $P_{T1}$, a velocity $V_{T1}$, acceleration $a_{T1}$, a jerk $\alpha_{T1}$ and a movement direction $d_{T1}$ of the tool 18 with respect to the workpiece A; information of a position (rotation angle) $P_{M1}$, a velocity (rotation speed) $V_{M1}$, acceleration (angular acceleration) $a_{M1}$, a jerk (angular jerk) $\alpha_{M1}$ and a movement direction (rotational direction) $d_{M1}$ of a rotary shaft of the electric motor 20; and information of a running mode RM of the industrial machine 12.

The processor 22 analyzes the work program WP, and acquires, as the running information, time-series data indicating, in time series, changes of the positions $P_{T1}$ and $P_{M1}$, the velocities $V_{T1}$ and $V_{M1}$, the acceleration $a_{T1}$ and $a_{M1}$, the jerks $\alpha_{T2}$ and $\alpha_{M1}$, the movement directions $d_{T1}$ and $d_{M1}$, and the running mode RM with respect to time t, based on the information of each statement included in the work program WP (e.g., the target position, minute line segment, target velocity). Accordingly, the processor 22 functions as a running information acquisition section 54 (FIG. 1) configured to acquire the running information.

Figure 5:
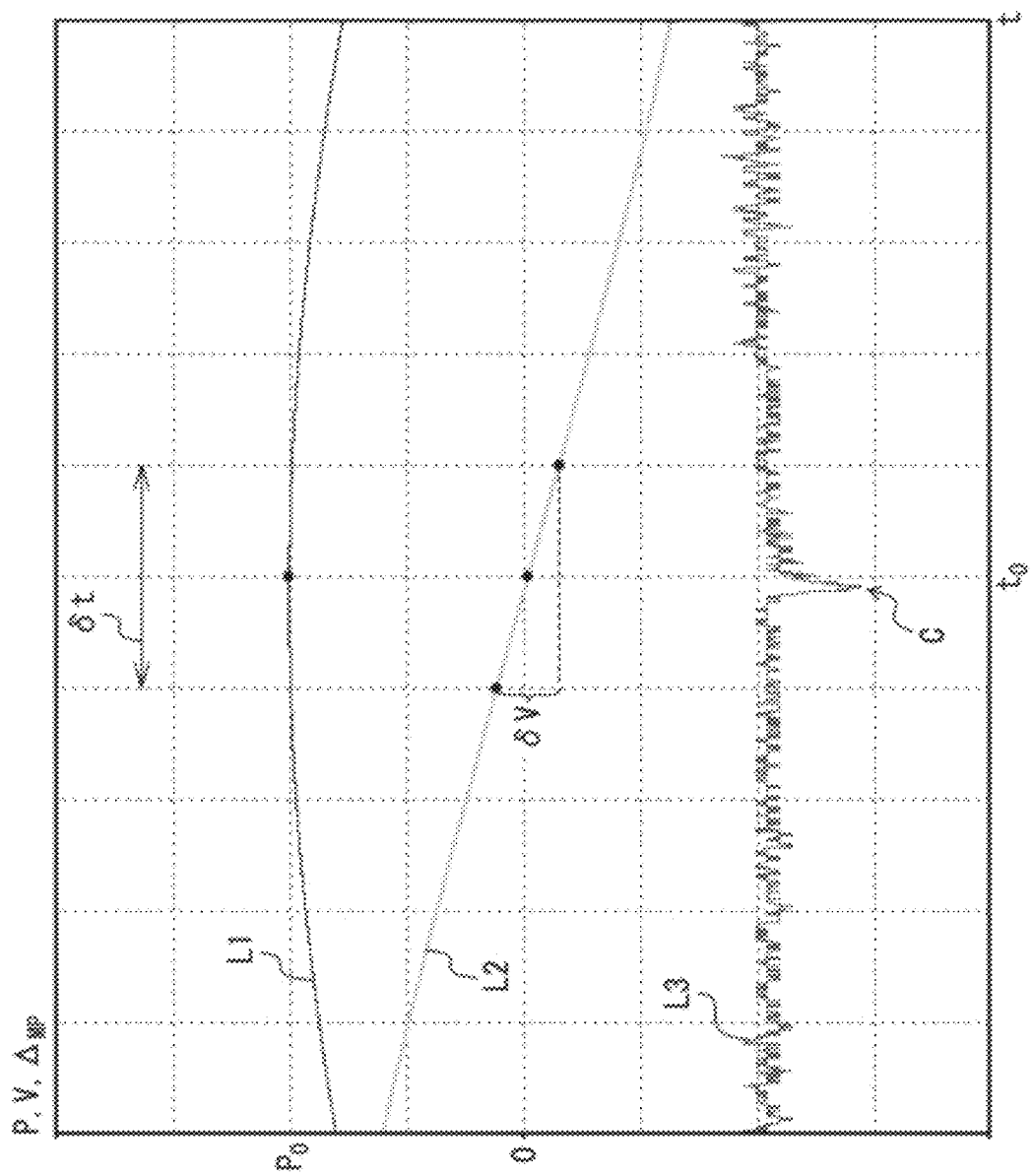
FIG. 5 illustrates an example of time-series data of running information.
Figure 6:
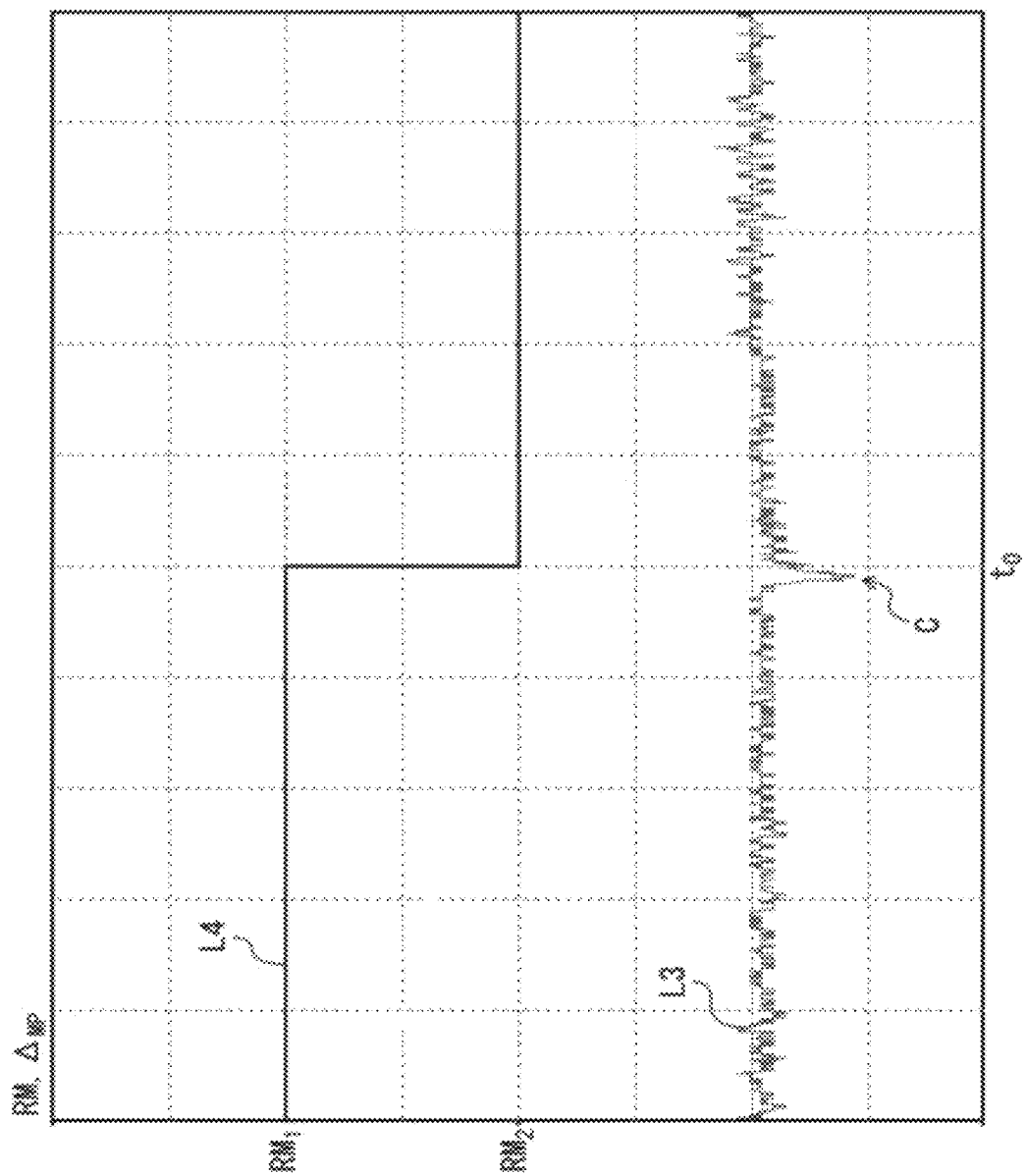
FIG. 6 illustrates an example of time-series data of running information.

FIGS. 5 and 6 each illustrates an example of a graph of time-series data of running information. FIG. 5 exemplifies a line L1 indicating the time-series data of the position $P_{T1}$ of the tool 18, and a line L2 indicating the time-series data of the velocity $V_{T1}$ of the tool 18, where the horizontal axis represents the time t, and the vertical axis represents a position P and a velocity V. On the other hand, FIG. 6 exemplifies a line L4 indicating the time-series data of the running mode RM, where the horizontal axis represents the time t and the vertical axis represents the running mode RM.

In the example illustrated in FIG. 5, the tool 18 moves in a direction toward a position $P_0$ while gradually decelerating, and reaches the position $P_0$ at a time point $t_0$. Subsequently, the tool 18 moves in a direction away from the position $P_0$ while accelerating. In this case, a change amount of the velocity $V_{T1}$ within a predetermined time $\delta t$ including the time point $t_0$ is $\delta V_{T1}$ in FIG. 5, and a change amount in the movement direction $d_{T1}$ of the tool 18 is 180 degrees (i.e., reversed).

A line L3 illustrated in the lower side of the graph in FIG. 5 indicates a difference $\Delta_{MP}$ between the movement path $MP_2$ of the tool 18 acquired from the work program WP and an actual movement path $MP_2$ of the tool 18 when the movement mechanism 16 is operated in accordance with the work program WP. As indicated by the line L3, the difference $\Delta_{MP}$ becomes large as indicated by an arrow C in the graph at the time point $t_0$ (strictly, a time point immediately before the time point $t_0$) at which the change amount in the movement direction $d_{T1}$ is large (e.g., the movement direction is reversed).

This phenomenon in which the difference $\Delta_{MP}$ becomes large may similarly occur also at a time point at which a change amount $\delta_2$ of the positions $P_{T1}$ and $P_{M1}$, the velocities $V_{T1}$ and $V_{M1}$, the acceleration $a_{T1}$ and $a_{M1}$, the jerks $\alpha_{T1}$ and $a_{M1}$, or the movement direction $d_{M1}$ increases. At the time point at which the change amount $\delta_1$ increases (i.e., the difference $\Delta_{MP}$ increases), the actual position (or path) of the tool 18 with respect to the workpiece during the work may be shifted from the target position (or path) defined by the work program, which may result in the generation of a defect in the finished surface of the workpiece A (e.g., an unintended line, pattern, or the like may be formed in the finished surface of the workpiece A when the workpiece is machined).

On the other hand, in the example illustrated in FIG. 6, the running mode RM of the industrial machine 12 is switched from a first running mode $RM_1$ to a second running mode $RM_2$. For example, the first running mode $RM_1$ is a positioning mode. The positioning mode is a running mode in which the movement mechanism 16 moves the tool 18 to a work start point at a velocity $V_{T1\_P}$ in a state where the tool 18 does not perform the work on the workpiece, for example. In the positioning mode, a control gain $G_C$, which determines a response speed of the control of the movement mechanism 16 by the processor 22, is set to $G_{C\_P}$. Further, a time constant τ when the movement mechanism 16 accelerates or decelerates the tool 18 is set to $T_p$.

On the other hand, the second running mode $RM_2$ is a work mode, for example. The work mode is a running mode in which the work on the workpiece is performed by the tool 18 while the movement mechanism 16 moves the tool 18 at a velocity $V_{T1\_W}$ ($<V_{T1\_P}$). In the work mode, the control gain $G_C$ is set to $G_{C\_W}$ ($>G_{C\_P}$), and the time constant τ is set to $\tau_W$ ($<\tau_p$). Accordingly, the responsiveness of the control of the movement mechanism 16 in the work mode is higher than that in the positioning mode.

As discussed above, at the time point $t_0$ at which the running mode RM of the industrial machine 12 is switched between the first running mode $RM_1$ and the second running mode $RM_2$, vibrations are generated in the tool 18, whereby the difference $\Delta_{MP}$ may increase as indicated by the arrow C in FIG. 6. Note that the first running mode $RM_1$ may be the work mode and the second running mode $RM_2$ may be the positioning mode, or the first running mode $RM_1$ and the second running mode $RM_2$ may be any running modes different from the work mode and positioning mode.

In the present embodiment, the processor 22 acquires a change point at which each change amount $\delta_1$ of the positions $P_{T1}$ and $P_{M1}$, the velocities $V_{T1}$ and $V_{M1}$, the acceleration $a_{T1}$ and $a_{M1}$, the jerks $\alpha_{T1}$ and $a_{M1}$, and the movement directions $d_{T1}$ and $d_{M1}$ within the predetermined time δt exceeds a predetermined threshold value $\delta_{th1}$ in the time-series data of the positions $P_{T1}$ and $P_{M1}$, the velocities $V_{T1}$ and $V_{M1}$, the acceleration $a_{T1}$ and $a_{M1}$, the jerks $\alpha_{T1}$ and $\alpha_{M1}$, and the movement directions $d_{T1}$ and $d_{M1}$.

Specifically, regarding positions $P_{T1}$ and $P_{M1}$, the processor 22 retrieves from the time-series data of the positions $P_{T1}$ and $P_{M1}$ the change point at which the change amount (i.e., the distance) between two positions within the predetermined time δt exceeds a threshold value $\delta_{th1}$, and acquires each time point $t_0$ at which such a change point occurs, for example.

Regarding the velocities $V_{T1}$ and $V_{M1}$, the acceleration $a_{T1}$ and $a_{M1}$, and the jerks $\alpha_{T1}$ and $\alpha_{M1}$, for example, the processor 22 retrieves the change point at which an absolute value of each change amount of the velocities $V_{T1}$ and $V_{M1}$, acceleration $a_{T1}$ and $a_{M1}$, and jerks $\alpha_{T1}$ and $\alpha_{M1}$ within the predetermined time δt exceeds the threshold value $\delta_{th1}$ from the time-series data of the velocities $V_{T1}$ and $V_{M1}$, acceleration $a_{T1}$ and $a_{M1}$, and jerks $\alpha_{T1}$ and $\alpha_{M1}$, and acquires each time point $t_0$ at which such a change point occurs.

Further, regarding the movement direction $d_{T1}$ of the tool 18, for example, the processor 22 calculates, as a change amount of the movement direction $d_{T1}$ within the time δt from a first time point $t_1$ to a second time point $t_2$ ($>t_1$) (i.e., $\delta t = t_2 - t_2$), an inner product IP of a movement direction $d_{T1\_t1}$ at the first time point $t_1$ and a movement direction $d_{T1\_t2}$ at the second time point $t_2$. For example, if each of the movement directions $d_{T1\_t1}$ and $d_{T1\_t2}$ is considered as an unit vector, and an angle between the movement directions $d_{T1\_t1}$ and $d_{T1\_t2}$ is represented as θ, the internal product IP can be calculated by the equation of IP=cos θ ($-1 \leq IP \leq 1$).

As the change amount (angle θ) from the movement direction $d_{T1\_t1}$ to the movement direction $d_{T1\_t2}$ becomes larger from 0 degrees toward 180 degrees, the inner product IP becomes smaller in the range of [$-1 \leq IP \leq 1$]. The processor 22 retrieves a change point at which the inner product IP becomes smaller exceeding the predetermined threshold value $\delta_{th1}$ from the time-series data of the movement direction $d_{T1}$, and acquires the time point $t_0$ at which such a change point occurs.

Alternatively, the processor 22 may calculate the angle θ between the movement direction $d_{T1\_t1}$ and the movement direction $d_{T1\_t2}$ as a change amount of the movement direction $d_{T1}$ within the time δt, and retrieve a change point at which the angle θ exceeds the predetermined threshold value $\delta_{th1}$ from the time-series data of the movement direction $d_{T1}$, and then acquire the time point $t_0$ at which the change point occurs.

Regarding the movement direction (rotation direction) $d_{M1}$ of the rotary shaft of the electric motor 20, for example, the processor 22 determines that the movement direction $d_{M1}$ exceeds the predetermined threshold value $\delta_{th1}$ (=180 degrees) when the movement direction $d_{M1}$ is reversed, and retrieves a change point at which the movement direction $d_{M1}$ is reversed from the time-series data of the movement direction $d_{M1}$, and then acquires the time point $t_0$ at which such a change point occurs.

On the other hand, regarding the running mode RM, the processor 22 retrieves a change point at which the first running mode $RM_1$ is switched to the second running mode $RM_2$ from the time-series data of the running mode RM (FIG. 6), and acquires the time point $t_0$ at which such a change point occurs. In this way, the processor 22 acquires each change point of the positions $P_{T1}$ and $P_{M1}$, the velocities $V_{T1}$ and $V_{M1}$, the acceleration $a_{T1}$ and $a_{M1}$, the jerks $\alpha_{T1}$ and $\alpha_{M1}$, the movement directions $d_{T1}$ and $d_{M1}$, and the running mode RM in the time-series data, and acquires the time point $t_0$ at which each change point occurs. Accordingly, the processor 22 functions as a change point acquisition section 56 (FIG. 1).

Next, the processor 22 specifies points on the movement path $MP_1$ corresponding to the respective change points of the running information $P_{T1}$, $P_{M1}$, $V_{T1}$, $V_{M1}$, $a_{T1}$ $a_{M1}$, $\alpha_{T1}$, $\alpha_{M1}$, $d_{T1}$, $d_{M1}$, and RM. In the present embodiment, the processor 22 acquires a total of eleven kinds of running information, i.e., the positions $P_{T1}$ and $P_{M1}$, the velocities $V_{T1}$ and $V_{M1}$, the acceleration $a_{T1}$ and $a_{M1}$, the jerks $\alpha_{T1}$ and $\alpha_{M1}$, the movement directions $d_{T1}$ and $d_{M1}$, and the running mode RM.

Thus, regarding these eleven kinds of running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, and RM, the processor 22 retrieves and specifies the points on the movement path $MP_1$ corresponding to the time points $t_0$ at which the change points of these pieces of running information occurs. In this regard, since the time-series data of the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$ and RM are associated with the statements included in the work program WP, the processor 22 can identify the statement of the work program WP that corresponds to the time point $t_0$, and thereby identifying the point on the movement path $MP_1$ corresponding to the time point $t_0$ via the statement of the work program WP.

In this way, the processor 22 identifies the plurality of points on the movement path $MP_1$ corresponding to the respective change points of the running information $P_{T1}$, $P_{M1}$, $V_{T1}$, $V_{M1}$, $a_{T1}$, $\alpha_{M1}$, $\alpha_{T1}$, $\alpha_{M1}$, $d_{T1}$, $d_{M1}$, and RM. Then, the processor 22 generates image data $ID_1$ in which the identified plurality of points on the movement path $MP_1$ are highlighted in display forms visually different from one another.

Figure 7:
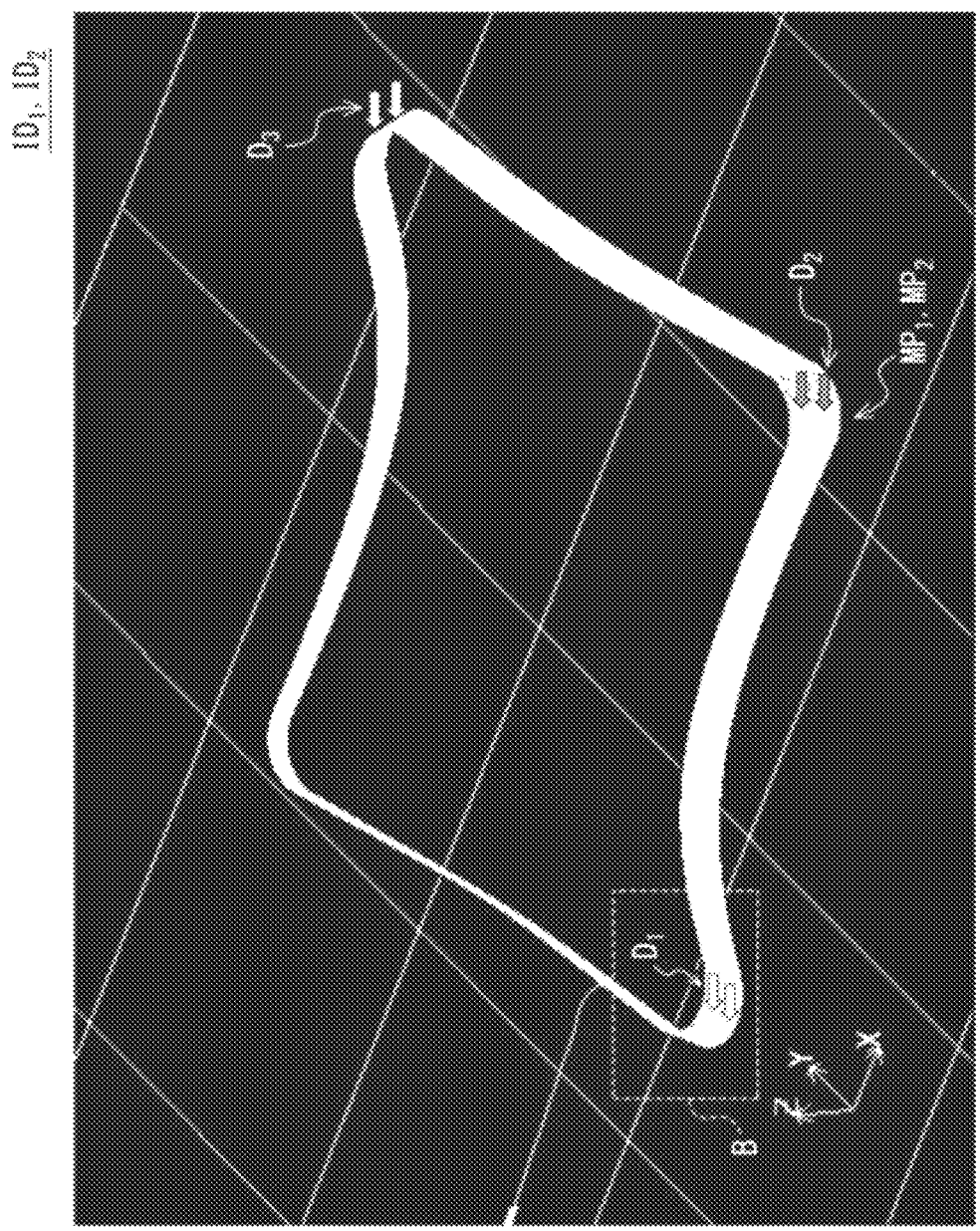
FIG. 7 illustrates an example of a picture of image data that is generated by an image data generation section illustrated in FIG. 1.
Figure 8:
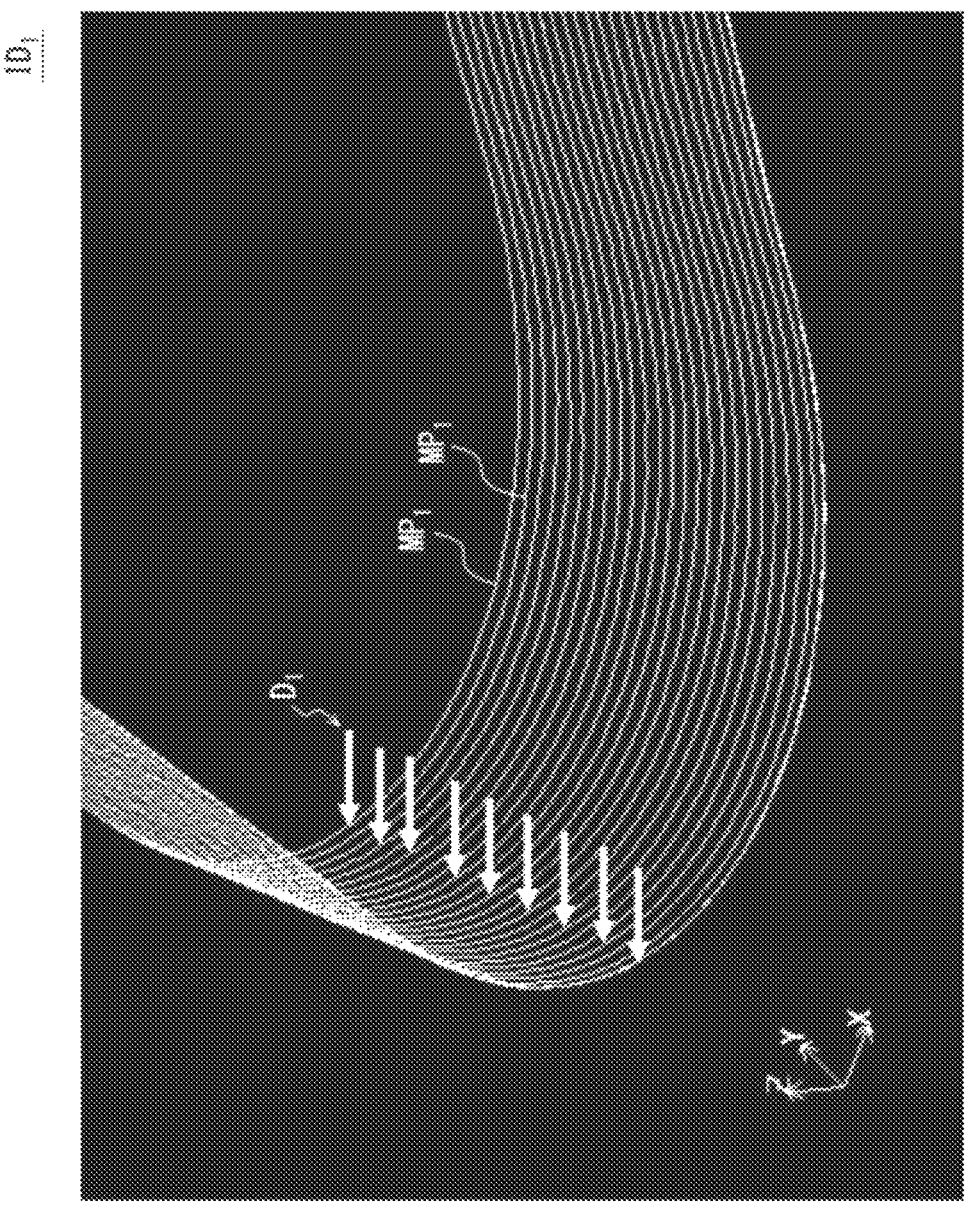
FIG. 8 is an enlarged view of a region B in FIG. 7.

An example of an image of the image data $ID_1$ is illustrated in FIGS. 7 and 8. In the example illustrated in FIG. 7, a point on the movement path $MP_1$ corresponding to a change point of first running information (e.g., the acceleration $\alpha_{T1}$ of the tool 18) is highlighted by an arrow $D_1$. A point on the movement path $MP_1$ corresponding to a change point of second running information (e.g., the movement direction $d_{M1}$ of the rotary shaft of the electric motor 20) is highlighted by an arrow $D_2$. Further, a point on the movement path $MP_1$ corresponding to a change point of third running information (e.g., the movement velocity $V_{T1}$ of the tool 18) is highlighted by an arrow $D_3$. FIG. 8 is an enlarged view of region B in FIG. 7.

The arrow $D_1$, the arrow $D_2$, and the arrow $D_3$ depicted in the image data $ID_1$ are displayed in different colors, different shapes, or different visual effects (flashing or the like) from one another, for example, and can be visually identified, respectively. Accordingly, the operator is able to visually recognize which of the running information either of the arrows $D_1$, $D_2$ or $D_3$ corresponds to.

Note that, in the image data $ID_1$ illustrated in FIG. 7, the points corresponding to the change points of the total of three kinds of running information (e.g., $a_{T1}$, $d_{M1}$, $V_{T1}$) are highlighted, for ease of understanding. However, for all of the eleven kinds of running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, and RM, the points corresponding to the change points thereof may be highlighted in the image data $ID_1$. As described above, in the image data $ID_1$, the points on the movement path $MP_1$ corresponding to the change points of the plurality of pieces of running information different from one another are highlighted on the movement path $MP_1$ in display forms visually different from one another. Accordingly, the processor 22 functions as an image data generation section 58 (FIG. 1) configured to generate the image data $ID_1$.

As stated above, in the present embodiment, the processor 22 functions as the movement path generation section 52, the running information acquisition section 54, the change point acquisition section 56, and the image data generation section 58 of the apparatus 50. These movement path generation section 52, the running information acquisition section 54, the change point acquisition section 56 and the image data generation section 58 constitute the apparatus 50.

The processor 22 transmits the generated image data $ID_1$ to the display device 30 via the I/O interface 26, and the display device 30 displays the image of the image data $ID_1$ as illustrated in FIGS. 7 and 8. The processor 22 may switch the image displayed on the display device 30 between the image illustrated in FIG. 7 and the enlarged image illustrated in FIG. 8, in response to the input information to the input device 32.

According to the present embodiment, if a defect occurs in a finished surface of the workpiece A when the industrial machine 12 performs the work on the workpiece A, the operator easily identifies a factor for the defect. More specifically, assume that the position of the defect generated in the finished surface of the workpiece A matches (or is close to) the position of the point highlighted in the image data $ID_1$, when the industrial machine 12 performs the work on the workpiece A in accordance with the machining program WP.

In this case, the operator can immediately identify which of the change points of the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, and RM, the point that matches (or is close to) the position of the defect generated in the workpiece A corresponds to. Thus, the operator may estimate that the factor for the defect results from the parameter relating to the identified running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$ or RM.

As a result, the operator is able to achieve an improvement in precision of the work performed on the workpiece A and a reduction in time necessary for startup of the mechanical system 10, by changing the machining program WP or the parameter (e.g., the statement of the machining program, control gain $G_C$, or time constant $\tau$) relating to the identified running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$ or RM.

The processor 22 may select a point to be highlighted in the image of the image data $ID_1$ from the plurality of kinds of running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$ and RM, in response to the input information to the input device 32, and may highlight in the image only the point corresponding to the selected running information.

Such an embodiment will be described with reference to FIG. 9. The image data $ID_1$ illustrated in FIG. 9 includes running-information-selection image data 60. The running-information-selection image data 60 is image data for making it possible to select the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$ or RM, and displays the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, and RM.

Figure 9:
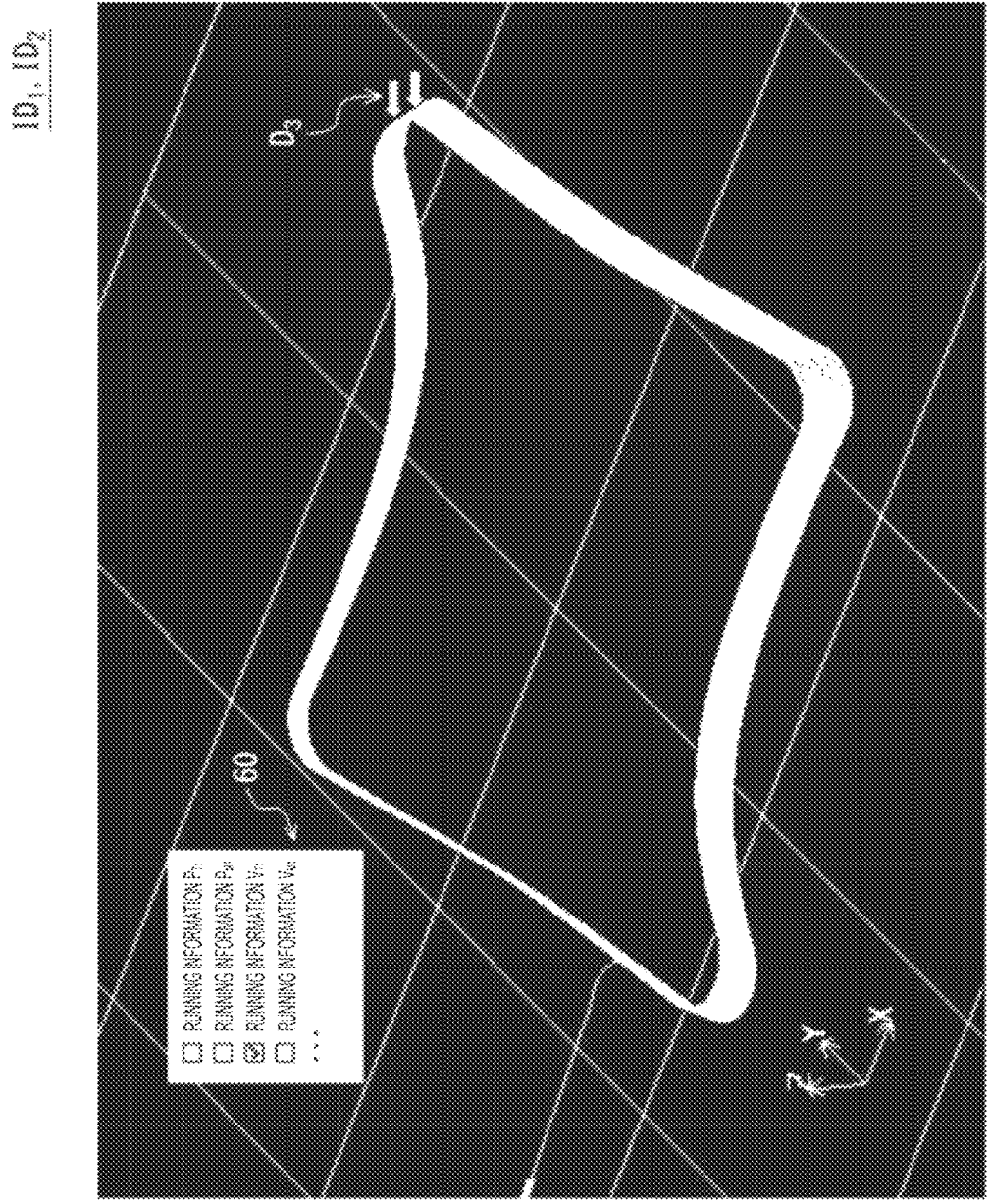
FIG. 9 illustrates another example of a picture of image data that is generated by the image data generation section.

In the example illustrated in FIG. 9, a check column is set for each of the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$ and RM, and configured such that a check mark is displayed in the check column of the selected running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$ or RM.

The operator operates the input device 32 (e.g., a mouse) so as to input the input information for selecting the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$ or RM to be highlighted, while viewing the image of the image data $ID_1$ displayed on the display device 30.

In response to the input information to the input device 32, the processor 22 highlights the point corresponding to the selected running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$ or RM, and displays the check mark in the check column of the selected running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, or RM. In the example depicted in FIG. 9, a case is illustrated where the running information $V_{T1}$ is selected. According to this configuration, the operator is able to easily select and highlight the point on the movement path $MP_1$ corresponding to the change point of the desired running information.

The processor 22 may display, in the image data $ID_1$, the relating parameter of the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, or RM corresponding to the point highlighted in the image data $ID_1$, in response to the input information to the input device 32. Such an embodiment will be described with reference to FIG. 10.

Figure 10:
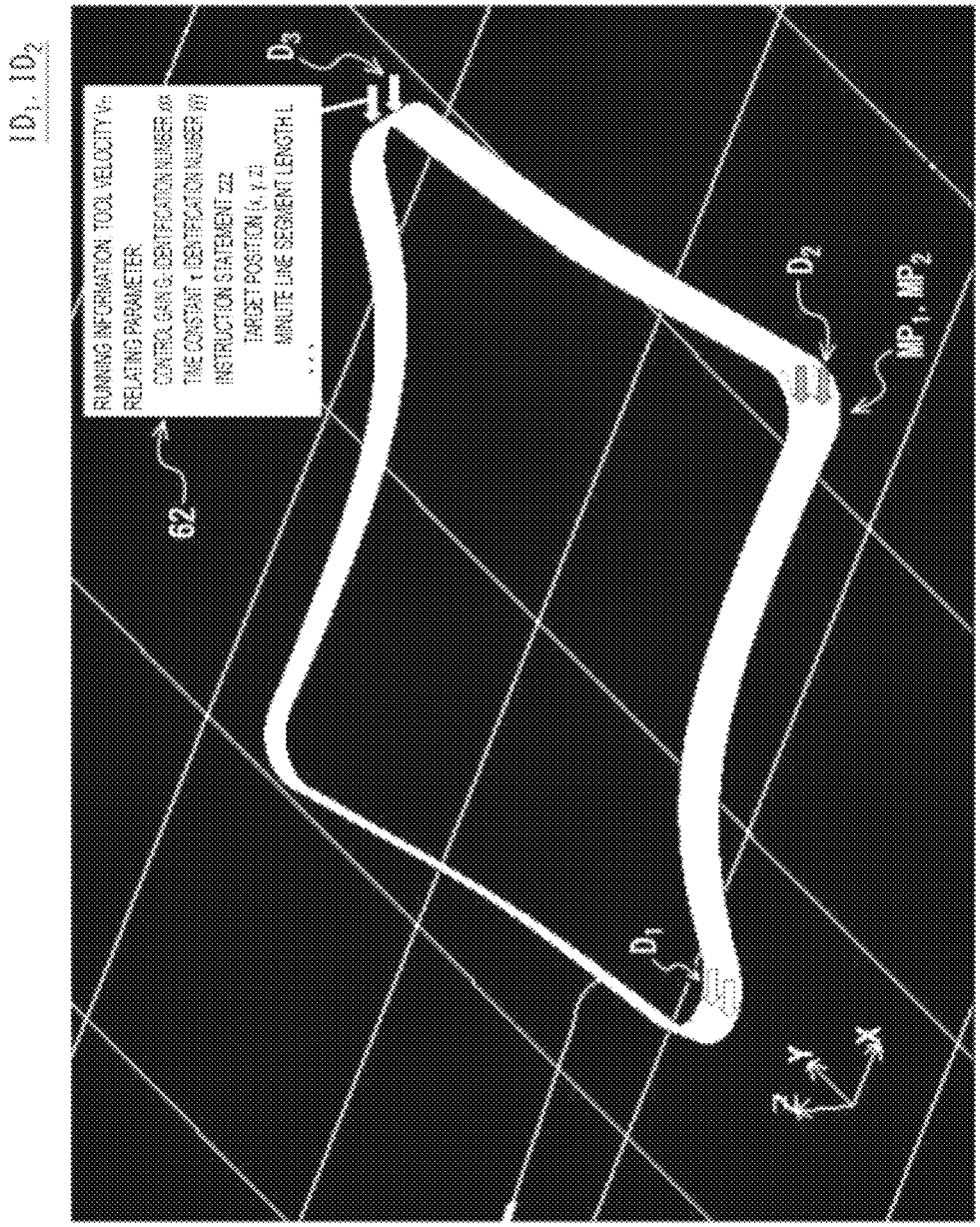
FIG. 10 illustrates yet another example of a picture of image data that is generated by the image data generation section.

The image data $ID_1$ illustrated in FIG. 10 includes parameter image data 62. The parameter image data 62 is image data for displaying the kind of the running information and the relating parameter which relates to that running information. The relating parameter includes e.g. setting values of the positions $P_{T1}$ and $P_{M1}$, the velocities $V_{T1}$ and $V_{M1}$, the acceleration $a_{T1}$ and $a_{M1}$, the jerks $\alpha_{T1}$ and $\alpha_{M1}$, the movement directions $d_{T1}$ and $d_{M1}$, and the running mode RM; the control gain $G_C$; or the time constant $\tau$.

In the example illustrated in FIG. 10, the parameter image data 62 displays the kind of the running information (i.e., the tool velocity $V_{T1}$) corresponding to the point highlighted by the arrow $D_3$, and also displays, as the relating parameter of the running information $V_{T1}$, a value of the control gain $G_C$ and an identification number of the control gain $G_C$, a value of the time constant $\tau$ and an identification number of the time constant $\tau$, and the corresponding statement of the machining program WP including the information of the target position coordinates and the minute line segment length. As illustrated in FIG. 10, each of the control gain $G_C$ and the time constant $\tau$ is assigned the identification number, and the setting information of the control gain $G_C$ and time constant can be retrieved from the identification numbers.

The operator operates the input device 32 (e.g., the mouse) so as to input the input information for selecting the point highlighted in the image data $ID_1$ (arrows $D_1$, $D_2$, $D_3$), while viewing the image of the image data $ID_1$ displayed on the display device 30. In response to the input information to the input device 32, the processor 22 displays, in the image data $ID_1$, the relating parameter of the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, or RM corresponding to the selected points (arrows $D_1$, $D_2$, $D_3$).

According to this configuration, in a case where the position of the defect generated in the workpiece A matches (is close to) the position of the point highlighted in the image data $ID_1$, the operator is able to refer to the relating parameter of the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, or RM that may be the factor for the defect, and verify the factor in more detail.

Figure 11:
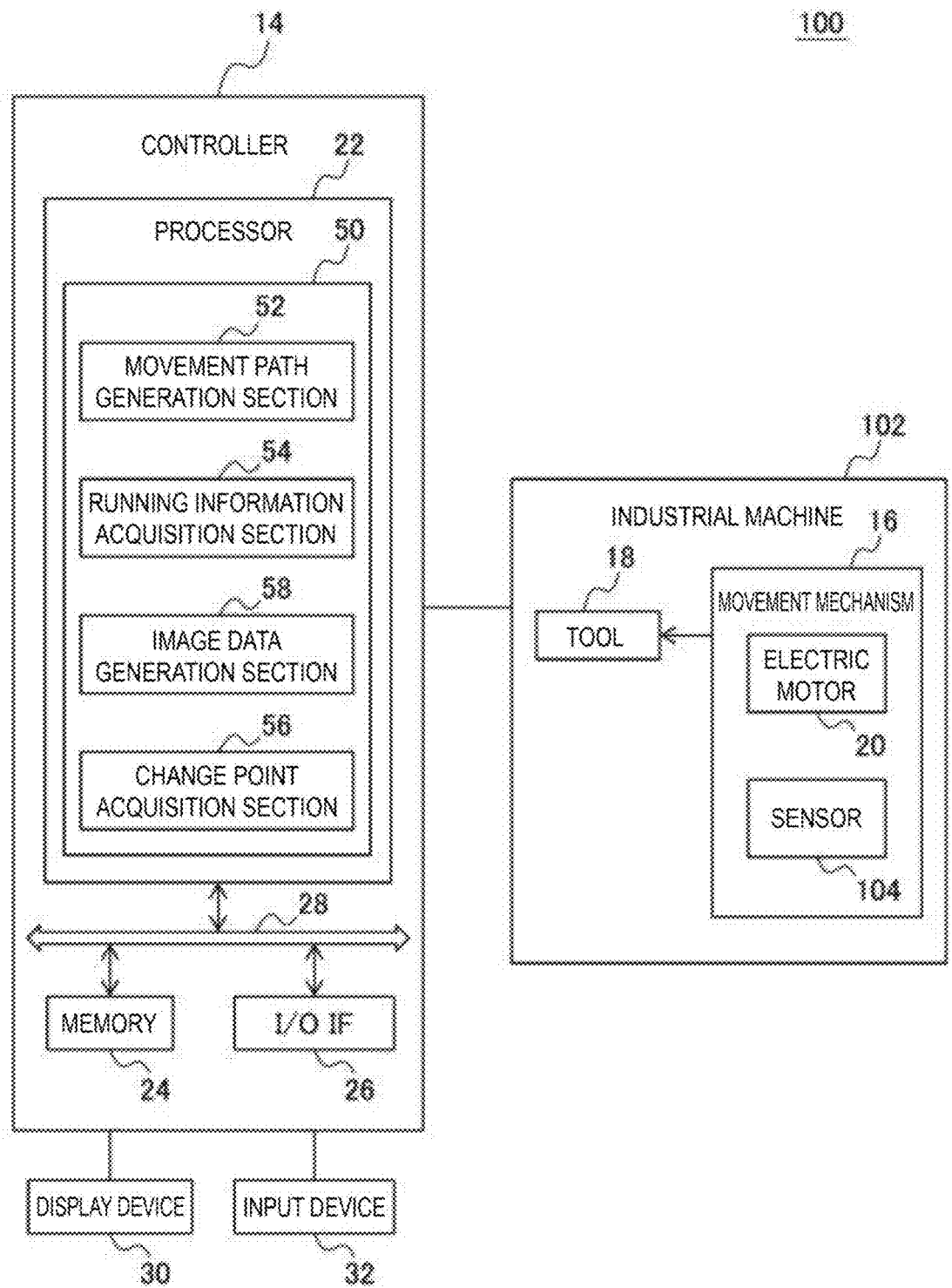
FIG. 11 is a block diagram of a mechanical system according to another embodiment.

Next, a mechanical system 100 according to another embodiment will be described with reference to FIG. 11. The mechanical system 100 is different from the above-described mechanical system 10 in an industrial machine 102. Specifically, the industrial machine 102 further includes a sensor 104, in addition to the movement mechanism 16 and the tool 18.

The sensor 104 includes e.g. a rotation detection sensor such as an encoder or a Hall element, or a force sensor such as a torque sensor or a force detection sensor, configured to detect the position $P_{M2}$ of the rotary shaft of the electric motor 20, the torque applied to the rotary shaft, or the force applied to the movement mechanism 16. The sensor 104 transmits the detected position $P_{M1}$, torque or force, as feedback information FB, to the processor 22 via the I/O interface 26.

The processor 22 receives the feedback information FB detected by the sensor 104 therefrom while operating the industrial machine 102 in accordance with the work program WP. For example, the processor 22 acquires the feedback information FB detected by the sensor 104 while operating the industrial machine 102 in accordance with the work program WP so as to actually perform the work on the workpiece A by the tool 18.

Alternatively, the processor 22 may acquire the feedback information FB detected by the sensor 104 while operating the industrial machine 102 in accordance with the work program WP without performing the actual work by the tool 18 (e.g., without activating the tool 18, or with the tool 18 being removed from the movement mechanism 16).

The processor 22 determines, from the feedback information FB from the sensor 104 (specifically, the position $F_{M2}$), a position $P_{T2}$ of the tool 18 relative to the workpiece A while operating the industrial machine 102 in accordance with the work program WP. Then, the processor 22 functions as the movement path generation section 52, and generates, from the position $P_{T2}$, the movement path $MP_2$ (second movement path) of the industrial machine 102 in a three-dimensional space.

Figure 12:
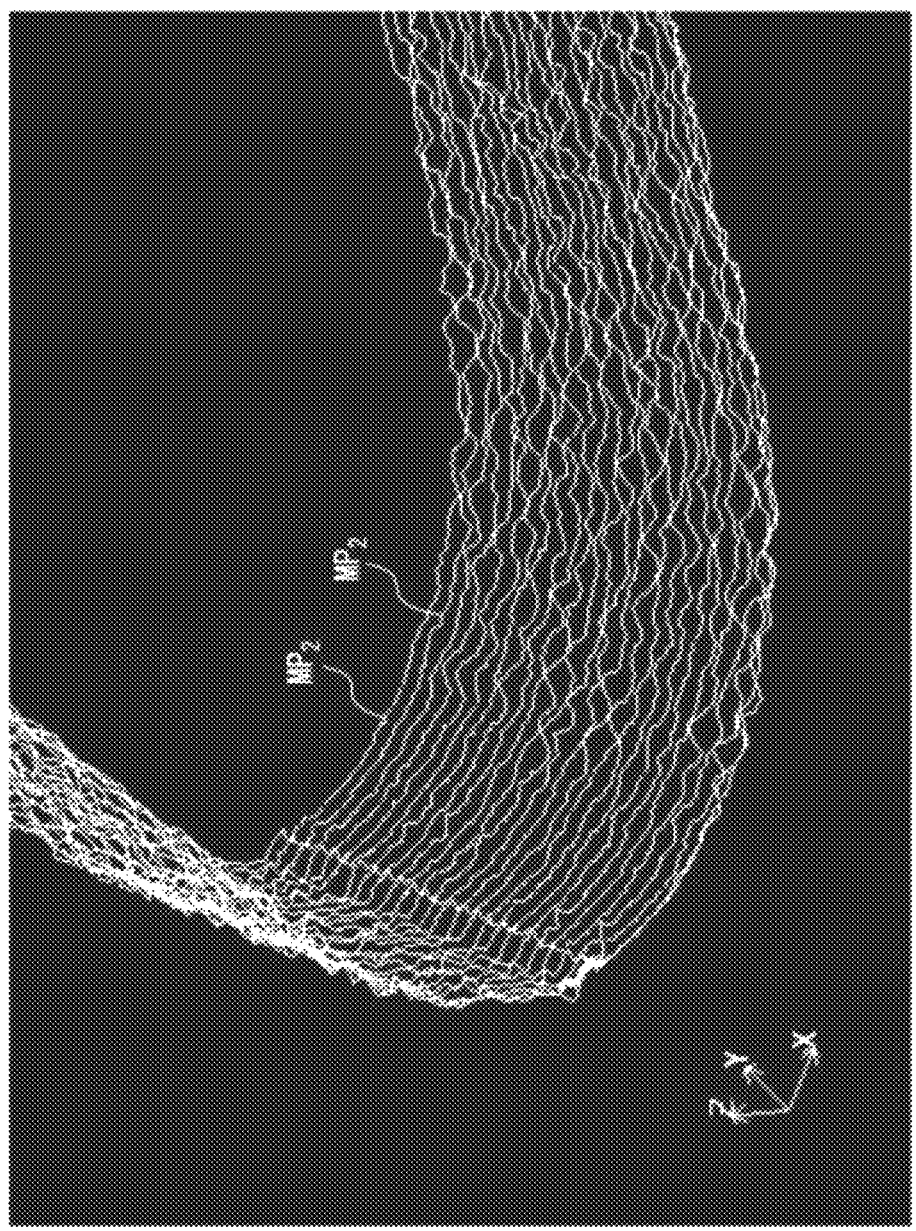
FIG. 12 is an enlarged view of the region B in FIG. 7.

The movement path $MP_2$ corresponds to the actual movement path of the movement mechanism 16 when the industrial machine 102 is operated in accordance with the work program WP. An example of the movement path $MP_2$ is illustrated in FIGS. 3 and 12. FIG. 12 is an enlarged view of the region B in FIG. 3. Each of the lines illustrated in FIG. 12 constitutes the movement path $MP_2$. Further, the processor 22 functions as the running information acquisition section 54, and acquires, from the feedback information FB, time-series data of the positions $P_{T2}$ and $P_{M2}$, velocities $V_{T2}$ and $V_{M1}$, acceleration $a_{T2}$ and $a_{M2}$, jerks $\alpha_{T2}$ and $\alpha_{M2}$, and movement directions $d_{T2}$ and $d_{M2}$, as the running information. The position $P_{T2}$, velocity $V_{T2}$, acceleration $a_{T2}$, jerk $\alpha_{T2}$, and movement direction $d_{T2}$ of the tool 18 with respect to the workpiece A, and the velocity $V_{M1}$, acceleration $a_{M2}$, jerk $\alpha_{M2}$, and movement direction $d_{M2}$ of the rotary shaft of the electric motor 20 can be obtained from the feedback information FB (i.e., the position $P_{M2}$ of the rotary shaft) from the sensor 104.

Then, similarly as the above-described method for acquiring the change points of the running information $P_{T1}$, $P_{M1}$, $V_{T1}$, $V_{M1}$, $a_{T1}$, $a_{M1}$, $\alpha_{T1}$, $\alpha_{M1}$, $d_{T1}$ and $d_{M1}$, the processor 22 functions as the change point acquisition section 56 to acquire a change point at which a change amount $\delta_2$ of each of the positions $P_{T2}$ and $P_{M2}$, velocities $V_{T2}$ and $V_{M2}$, acceleration $a_{T2}$ and $a_{M2}$, jerks $\alpha_{T2}$ and $\alpha_{M2}$, and movement directions $d_{T2}$ and $d_{M2}$ exceeds a predetermined threshold value $\delta_{th2}$ within a predetermined time $\delta t$ in the time-series data of the positions $P_{T2}$ and $P_{M2}$, velocities $V_{T2}$ and $V_{M2}$, acceleration $a_{T2}$ and $a_{M2}$, jerks $\alpha_{T2}$ and $\alpha_{M2}$, and movement directions $d_{T2}$ and $d_{M2}$.

The processor 22 acquires, in the time-series data, the change point of each of the positions $P_{T2}$ and $P_{M2}$, velocities $V_{T2}$ and $V_{M2}$, acceleration $a_{T2}$ and $a_{M2}$, jerks $\alpha_{T2}$ and $\alpha_{M2}$, and movement directions $d_{T2}$ and $d_{M2}$; and the time point $t_0$ at which each change point occurs, and then identifies the points on the movement path $MP_2$ corresponding to the respective change points.

The time-series data of the running information $P_{T2}$, $P_{M2}$, $V_{T2}$, $V_{M2}$, $a_{T2}$, $a_{M2}$, $\alpha_{T2}$, $\alpha_{M2}$, $d_{T2}$ and $d_{M2}$, and the movement path $MP_2$ are data acquired from the feedback information FB, and are associated with each other via time t. Accordingly, the processor 22 is able to retrieve and identify the points on the movement path $MP_2$ corresponding to the time points $t_0$ at which the change points of the running information $P_{T2}$, $P_{M2}$, $V_{T2}$, $V_{M2}$, $a_{T2}$, $a_{M2}$, $\alpha_{T2}$, $\alpha_{M2}$, $d_{T2}$, and $d_{M2}$ acquired from the feedback information FB occur.

Figure 13:
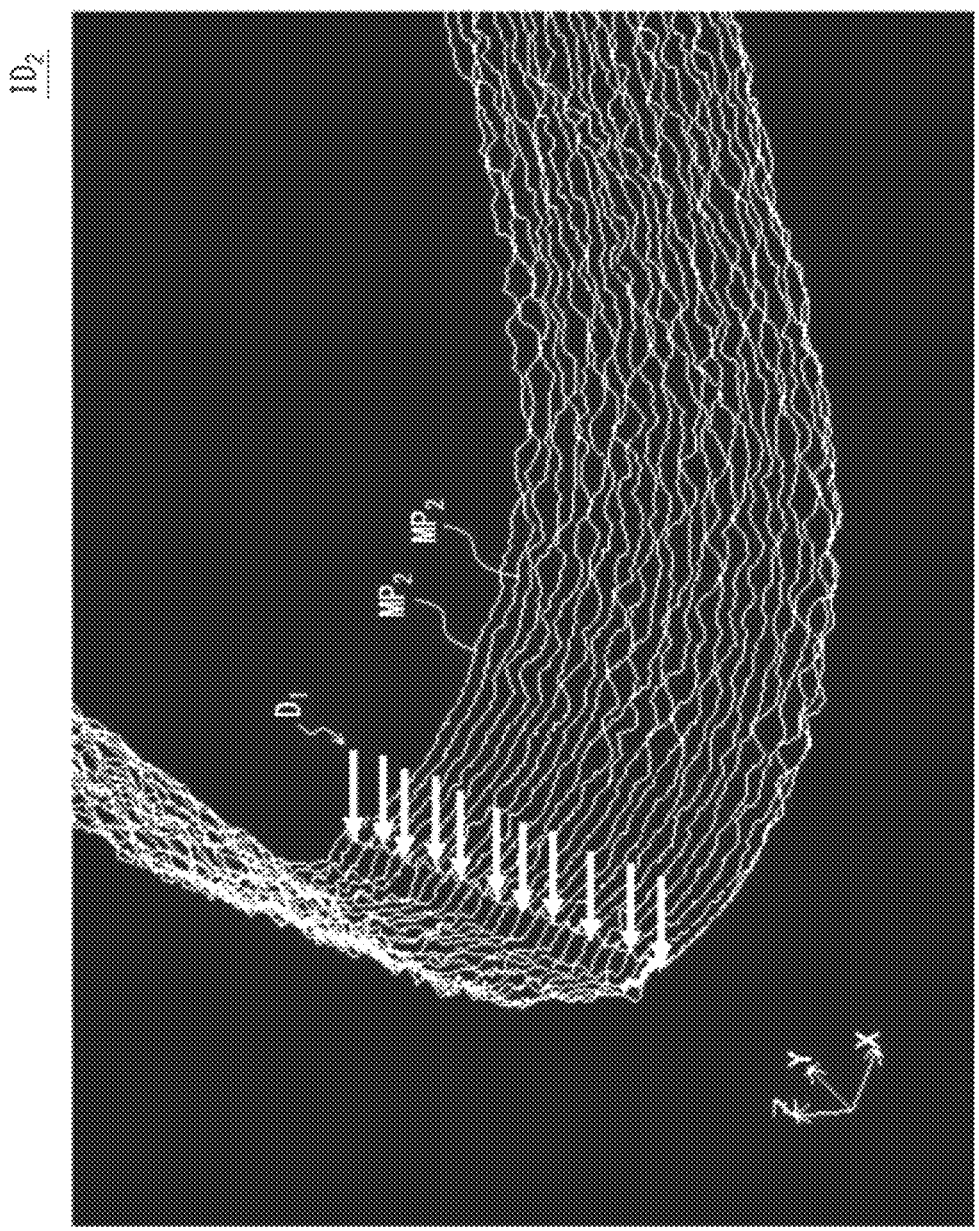
FIG. 13 illustrates an example of a picture of image data that is generated by an image data generation section illustrated in FIG. 11.

Then, the processor 22 functions as the image data generation section 58 to generate image data $ID_2$ in which the points on the movement path $MP_2$ corresponding to the change points of the running information $P_{T2}$, $P_{M2}$, $V_{T2}$, $V_{M2}$, $a_{T2}$, $a_{M2}$, $\alpha_{T2}$, $\alpha_{M2}$, $d_{T2}$ and $d_{M2}$ are highlighted on the movement path $MP_2$ in display forms visually different from one another. An example of the image data $ID_2$ is illustrated in FIGS. 7 and 13.

In the example illustrated in FIG. 7, a point on the movement path $MP_2$ corresponding to a change point of first running information (e.g., the acceleration $a_{T2}$ of the tool 18) is highlighted by the arrow $D_1$. Further, a point on the movement path $MP_2$ corresponding to a change point of second running information (e.g., the movement direction $d_{M2}$ of the rotary shaft of the electric motor 20) is highlighted by the arrow $D_2$. Furthermore, a point on the movement path $MP_2$ corresponding to a change point of third running information (e.g., the movement velocity $V_{T2}$ of the tool 18) is highlighted by the arrow $D_3$.

The arrow $D_1$, the arrow $D_2$, and the arrow $D_3$ depicted in the image data $ID_2$ are displayed in different colors, different shapes, or different visual effects (flashing or the like) from one another, and thereby can be visually identified. Accordingly, the operator is able to visually recognize which of the running information each of the arrows $D_1$, $D_2$, and $D_3$ in the image data $ID_2$ corresponds to.

Note that, in the image data $ID_2$ illustrated in FIG. 7, for ease of understanding, an example is illustrated in which the points corresponding to the change points of the total of three kinds of running information (e.g., $a_{T2}$, $d_{M2}$, $V_{T2}$) are highlighted. However, for all of ten kinds of the running information $P_{T2}$, $P_{M2}$, $V_{T2}$, $V_{M2}$, $a_{T2}$, $a_{M2}$, $\alpha_{T2}$, $\alpha_{M2}$, $d_{T2}$, and $d_{M2}$, the points corresponding to the change points thereof may be highlighted.

As described above, in the image data $ID_2$, the points on the movement path $MP_2$ corresponding to the change points of the plurality of pieces of running information different from one another acquired from the feedback information FB are highlighted on the movement path $MP_2$ in display forms visually different from one another. The processor 22 may switch the image to be displayed on the display device 30 between the image illustrated in FIG. 7 and the enlarged image illustrated in FIG. 12, in response to input information to the input device 32. According to the present embodiment, if the defect occurs in the finished surface of the workpiece A when the industrial machine 102 performs the work on the workpiece A, the operator easily identifies the factor for the defect.

Note that, as illustrated in FIG. 9, the processor 22 of the mechanical system 100 may select the point to be highlighted in the image of the image data $ID_2$ from the plurality of kinds of running information $P_{T2}$, $P_{M2}$, $V_{T2}$, $V_{M2}$, $a^{T2}$, $a_{M2}$, $\alpha^{T2}$, $\alpha_{M2}$, $d_{T2}$, and $d_{M2}$, in response to the input information to the input device 32, and may highlight only the point corresponding to the selected running information in the image.

Further, as illustrated in FIG. 10, the processor 22 of the mechanical system 100 may display, in the image data $ID_2$, the relating parameters of the running information $P_{T2}$, $P_{M2}$, $V_{T2}$, $V_{M2}$, $a_{T2}$, $a_{M2}$, $a_{T2}$, $a_{M2}$, $d_{T2}$, or $d_{M2}$ corresponding to the point highlighted in the image data $ID_2$, in response to the input information to the input device 32.

Furthermore, the processor 22 of the mechanical system 100 may acquire, as the running information, the time-series data of the positions $P_{T1}$ and $P_{M1}$, velocities $V_{T1}$ and $V_{M1}$, acceleration $a_{T1}$ and $a_{M1}$, jerks $\alpha_{T1}$ and $a_{M1}$, movement directions $d_{T1}$ and $d_{M1}$, and the running mode RM; and the time-series data of the positions $P_{T2}$ and $P_{M2}$, velocities $V_{T2}$ and $V_{M2}$, acceleration $a_{T2}$ and $a_{M2}$, jerks $\alpha_{T1}$ and $\alpha_{M2}$, movement directions $d_{T1}$ and $d_{M1}$.

In this case, the processor 22 may highlight, in the image data $ID_2$, the points on the movement path $MP_2$ corresponding to the change points of the running information $P_{T2}$, $P_{M2}$, $V_{T2}$, $V_{M2}$, $a_{T2}$, $a_{M2}$, $\alpha^{T2}$, $\alpha_{M2}$, $d_{T2}$ and $d_{M2}$, and also the points on the movement path $MP_2$ corresponding to the change points of the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, and RM on the movement path $MP_2$.

Further, in the mechanical system 100, the processor 22 may generate both the movement paths $MP_1$ and $MP_2$, display the movement paths $MP_1$ and $MP_2$ in the image data $ID_2$, and highlight the points on the movement path $MP_1$ corresponding to the change points of the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$ and RM, as well as the points on the movement path $MP_2$ (or the movement path $MP_1$) corresponding to the change points of the running information $P_{T2}$, $P_{M2}$, $V_{T2}$, $V_{M2}$, $a_{T2}$, $a_{M2}$, $\alpha_{T2}$, $\alpha_{M2}$, $d_{T2}$, and $d_{M2}$.

Figure 14:
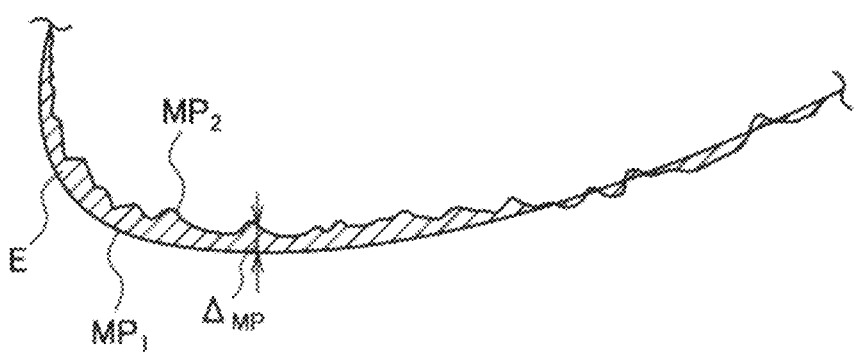
FIG. 14 illustrates an example of a picture of image data in which a difference between movement paths is represented.

The processor 22 may acquire the difference $\Delta_{MP}$ between the movement path $MP_1$ and the movement path $MP_2$, and display the difference $\Delta_{MP}$ in the image data $ID_2$. Such an embodiment is illustrated in FIG. 14. In FIG. 14, in order to facilitate the understanding, a single movement path $MP_1$ and a single movement path $MP_2$ corresponding to the single movement path $MP_1$ are illustrated.

For example, the processor 22 displays a region E corresponding to the difference $\Delta_{MP}$ between the movement path $MP_1$ and the movement path $MP_2$ as a colored region (e.g., a red-colored region). The processor 22 may enlarge and display the difference $\Delta_{MP}$ (i.e., the region E) in the image data $ID_2$, in response to the input information to the input device 32.

In the above-described embodiments, the processor 22 may acquire time-series data of digital signals in which discrete numerical data exist in time sequence as the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, $P_{T2}$, $P_{M2}$, $V_{T2}$, $V_{M2}$, $a_{T2}$, $a_{M2}$, $\alpha_{T2}$, $\alpha_{M2}$, $d_{T2}$, or $d_{M2}$, not being limited to the time-series data of continuous analog signals as illustrated in FIG. 5. The processor 22 may acquire simple numerical data as the running information, rather than time-series data.

The running information RM may not be limited to the time-series data as illustrated in FIG. 6, and information on the command or the time $t_0$ for switching the running mode RM of the industrial machine 12 may be acquired as the running information RM.

The change point acquisition section 56 may be omitted from the above-described embodiments. In this case, the operator may manually identify and input the change points of the running information $P_{T1}$, $P_{M1}$, $V_{T1}$, $V_{M1}$, $a_{T1}$, $a_{M1}$, $\alpha_{T1}$, $\alpha_{M1}$ $d_{T1}$, $d_{M1}$, RM, $P_{T2}$, $P_{M2}$, $V_{T2}$, $V_{M2}$, $a_{T2}$, $a_{M2}$, $\alpha_{T2}$, $\alpha_{M2}$, $d_{T2}$, or $d_{M2}$ from the time-series data thereof, for example.

In the above-described embodiments, the points on the movement path MP corresponding to the change points of the running information $P_{T1}$, $P_{M1}$, $V_{T1}$, $V_{M1}$, $a_{T1}$, $a_{M1}$, $\alpha_{T1}$, $\alpha_{M1}$, $d_{T1}$, $d_{M1}$, RM, $P_{T2}$, $P_{M2}$, $V_{T2}$, $V_{M2}$, $a_{T2}$, $a_{M2}$, $\alpha_{T2}$, $\alpha_{M2}$, $d_{T2}$, and $d_{M2}$ are highlighted by the arrows $D_1$, $D_2$, and $D_3$. However, the point on the movement path MP corresponding to the change point may be highlighted in any display form (e.g., colored dot, triangular point, or square point). Although the present disclosure has been described through the embodiments, the embodiments are not intended to limit the invention according to the claims.

The invention claimed is:

1. An apparatus configured to generate image data of a movement path of an industrial machine, the apparatus comprising:
a processor configured to:
generate the movement path of the industrial machine when performing a work on a workpiece;
acquire running information of the industrial machine when performing the work on the workpiece; and
generate image data in which a first point on the movement path corresponding to a change point of first running information, and a second point on the movement path corresponding to a change point of second running information different from the first running information are highlighted on the movement path in display forms visually different from each other,
wherein a position of a defect generated in a surface of the workpiece when the industrial machine performs the work on the workpiece in accordance with a machining program matches the highlighted image data on the movement path,
wherein the processor is further configured to change a parameter of the running information in the machining program based upon the highlighted change points to control an operation of the industrial machine.

2. The apparatus of claim 1, wherein the running information includes:
a position, a velocity, acceleration, a jerk or a movement direction of the industrial machine; or
a running mode of the industrial machine.

3. The apparatus of claim 2, wherein the running information includes time-series data that indicates, in time series, a change of the position, the velocity, the acceleration, the jerk, the movement direction, or the running mode with respect to time.

4. The apparatus of claim 1, wherein the processor acquires the running information from the work program for performing the work on the workpiece, or from feedback information detected when the industrial machine is operated in accordance with the work program.

5. The apparatus of claim 1, wherein the processor generates:
a first movement path defined by the work program for performing the work on the workpiece; and
a second movement path when the industrial machine is operated in accordance with the work program,
wherein the processor generates the image data in which the first movement path and the second movement path are displayed.

6. The apparatus of claim 5, wherein the processor generates the image data such that a difference between the first movement path and the second movement path can be enlarged and displayed.

7. A controller of the industrial machine, comprising the apparatus of claim 1.

8. An apparatus configured to generate image data of a movement path of an industrial machine, the apparatus comprising:
a processor configured to:
generate the movement path of the industrial machine when performing a work on a workpiece;
acquire running information of the industrial machine when performing the work on the workpiece;
generate image data in which a first point on the movement path corresponding to a change point of first running information, and a second point on the movement path corresponding to a change point of second running information different from the first running information are highlighted on the movement path in display forms visually different from each other,
wherein a position of a defect generated in a surface of the workpiece when the industrial machine performs the work on the workpiece in accordance with a machining program matches the highlighted image data on the movement path,
wherein the running information includes time-series data that indicates, in time-series, a change of the position, the velocity, the acceleration, the jerk, the movement direction, or the running mode with respect to time, and
wherein the processor is further configured to: change a parameter of the running information in the machining program based upon the highlighted change points to control an operation of the industrial machine, and acquire, in the time-series data:
the change point at which a change amount of the position, the velocity, the acceleration, the jerk, or the movement direction within a predetermined time exceeds a predetermined threshold value; or
the change point at which first running mode is switched to second running mode.

9. A method for generating image data of a movement path of an industrial machine, the method comprising:
generating the movement path of the industrial machine when performing a work on a workpiece;
acquiring running information of the industrial machine when performing the work on the workpiece;
generating the image data in which a first point on the movement path corresponding to a change point of first running information, and a second point on the movement path corresponding to a change point of second running information different from the first running information are highlighted on the movement path in display forms visually different from each other,
wherein a position of a defect generated in a surface of the workpiece when the industrial machine performs the work on the workpiece in accordance with a machining program matches the highlighted image data on the movement path; and
changing a parameter of the running information in the machining program based upon the highlighted change points to control an operation of the industrial machine.

10. An apparatus configured to generate image data of a movement path of an industrial machine, the apparatus comprising a processor configured to:
generate the movement path of the industrial machine when performing a work on a workpiece;
acquire time-series data that indicates, in time series, a change of running information of the industrial machine with respect to time, during performing the work on the workpiece;
retrieve, from the time-series data, a first change point of first running information, determine, in the time-series data, a first time point at which the first change point occurs, and specify a first point on the movement path corresponding to the determined first time point;
retrieve, from the time-series data, a second change point of second running information different from the first running information, determine, in the time-series data, a second time point at which the second change point occurs, and specify a second point on the movement path corresponding to the determined second time point;

generate image data in which the first point and the second point are highlighted on the movement path in display forms visually different from each other; and change a parameter of the running information in a machining program of the industrial machine based upon the highlighted first point and the second point in the movement path.

\* \* \* \* \*